(12) United States Patent
Perreault et al.

(10) Patent No.: US 12,548,017 B2
(45) Date of Patent: Feb. 10, 2026

(54) SYSTEMS AND METHODS FOR USER AUTHENTICATION BY A THIRD-PARTY SERVER

(71) Applicant: Shopify Inc., Ottawa (CA)

(72) Inventors: Mathieu Perreault, Mont Royal (CA); Ilya Grigorik, San Francisco, CA (US); Mikhail Korablin, Kingston, NY (US); Stijn Heymans, Palm Desert, CA (US)

(73) Assignee: Shopify Inc., Ottawa (CA)

( * ) Notice: Subject to any disclaimer, the term of this patent is extended or adjusted under 35 U.S.C. 154(b) by 1 day.

(21) Appl. No.: 18/147,669

(22) Filed: Dec. 28, 2022

(65) Prior Publication Data
US 2024/0220978 A1 Jul. 4, 2024

(51) Int. Cl.
G06Q 20/40 (2012.01)
G06Q 20/08 (2012.01)

(52) U.S. Cl.
CPC ........... G06Q 20/40 (2013.01); G06Q 20/085 (2013.01)

(58) Field of Classification Search
CPC .............................. G06Q 20/40; G06Q 20/085
USPC ........................................................... 705/44
See application file for complete search history.

(56) References Cited

U.S. PATENT DOCUMENTS

| 11,051,067 | B1* | 6/2021 | Baxter | G06Q 20/123 |
| 2013/0151352 | A1* | 6/2013 | Tsai | H04N 21/4438 |
| | | | | 705/14.73 |
| 2017/0236196 | A1* | 8/2017 | Isaacson | G06Q 20/12 |
| | | | | 705/14.51 |
| 2023/0097083 | A1* | 3/2023 | Perreault | G06Q 20/12 |
| | | | | 705/27.1 |

* cited by examiner

Primary Examiner — Hai Tran
(74) Attorney, Agent, or Firm — Foley & Lardner LLP

(57) ABSTRACT

A server of a first network domain receives an indication container object created in a second network domain. The server identifies, based on the indication container object, a unique identifier, where the unique identifier allows initiation of logging into an account. The server transmits a confirmation code to a user device that is identified based on the unique identifier. Transmitting the confirmation code allows completion of login to the account.

17 Claims, 11 Drawing Sheets

540

< Back        shop Pay

Shop 1

| | |
|---|---|
| Email | shop_pay_user@myshopify.io |

542 — Ship to   Seed 2 Junior
12232 Street Road
Cornwall, ON, K6H 5R6, CA    ∨ — 550

544 — Delivery   Standard
(3 to 9 business days) · Free

546 — Card   VISA ending with 4242
123 sesam's street, app 123, Montreal
QC H0H 0H0, Canada Order summary Awesome Silk Car    $118.99
Practical Concrete Computer Add a discount code or a gift card Subtotal    $118.99
Shipping    Free
548 — Total    USD $118.99

[ Pay now ] — 552

FIG. 5D

SYSTEMS AND METHODS FOR USER AUTHENTICATION BY A THIRD-PARTY SERVER

TECHNICAL FIELD

The present disclosure relates to authentication across network domains.

BACKGROUND

An online store can have a storefront operated by one enterprise and a payment processing portal operated by another enterprise. A user browses the storefront to view and interact with products for sale from the enterprise operating the storefront. When the user is ready to checkout, the user is redirected from the storefront to the payment processing portal. Since the storefront and payment processing portal can be associated with different network domains, redirecting the user to the payment processing portal typically entails directing a browser application from one network domain to another network domain.

BRIEF DESCRIPTION OF THE DRAWINGS

Detailed descriptions of implementations of the present invention will be described and explained through the use of the accompanying drawings.

FIGS. 5A-5D are example user interfaces displayed during a process for using a payment processing service from the first network domain to purchase an item sold via a website on the second network domain.

Figure 1:
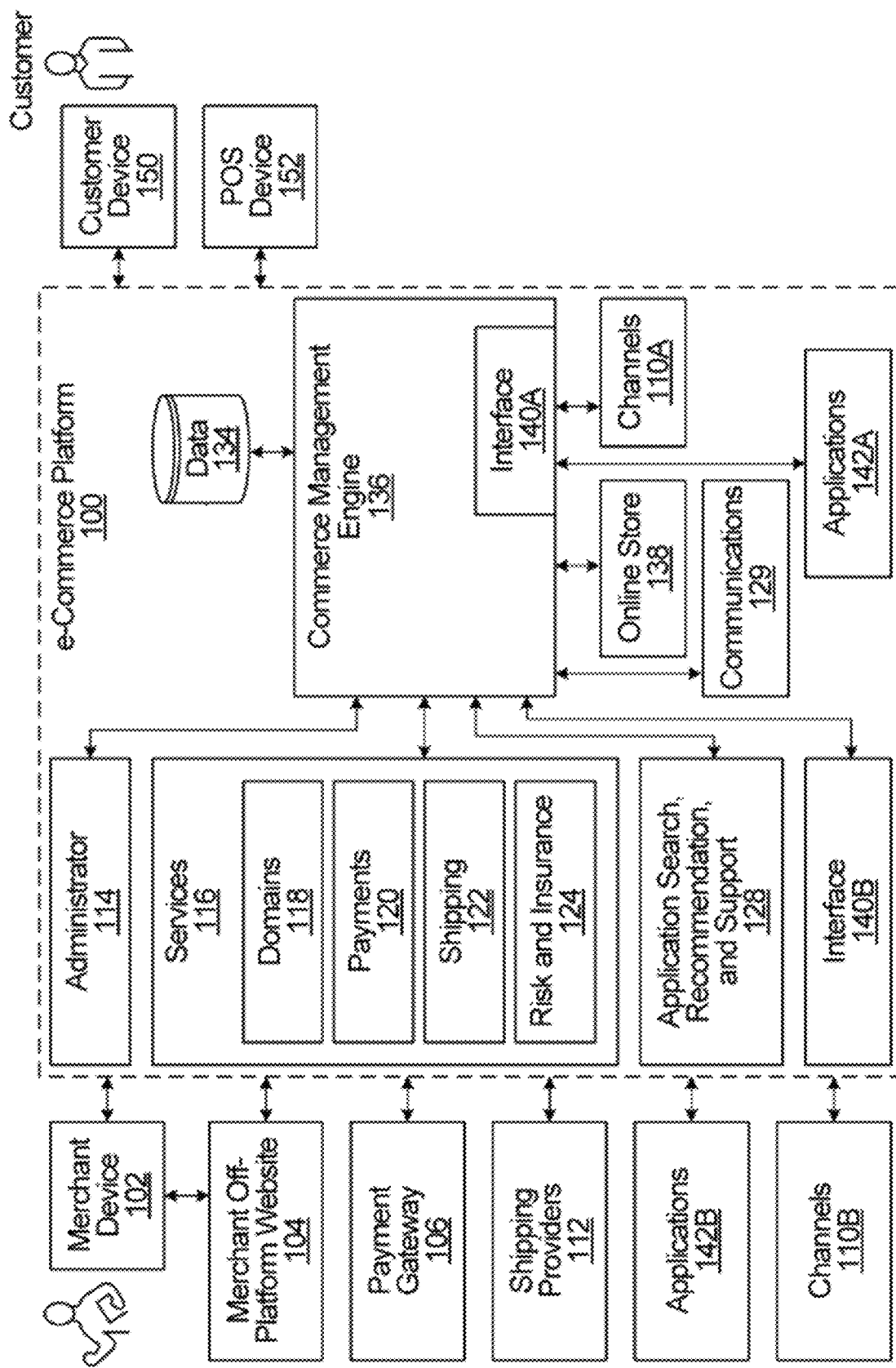
FIG. 1 illustrates an example e-commerce platform, according to some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Browser applications typically store cookies to maintain information about user sessions associated with various network domains. Traditionally, these cookies include both first-party cookies, which are readable only by the network domain in which the cookie was created, and third-party cookies, which are readable by third-party domains as well as the domain in which the cookie was created. Third-party cookies have historically been used to pass information between different network domains. However, third-party cookies may not always be available. For example, a particular browser application may not support third-party cookies or a user of the browser may opt out of third-party cookies.

According to implementations herein, a server of a first network domain facilitates user login or authentication based on information received from a second network domain, without use of a third-party cookie to carry the information from the second domain to the first domain. The server receives an indication container object created in the second network domain. The server identifies, based on the indication container object, a unique identifier, where the unique identifier allows initiation of logging into an account. The server transmits a confirmation code to a user device that is identified based on the unique identifier. Transmitting the confirmation code allows completion of login to the account.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

An Example E-Commerce Platform

Although integration with a commerce platform is not required, in some embodiments, the methods disclosed herein may be performed on or in association with a commerce platform such as an e-commerce platform. Therefore, an example of a commerce platform will be described.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (Saas), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings that may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
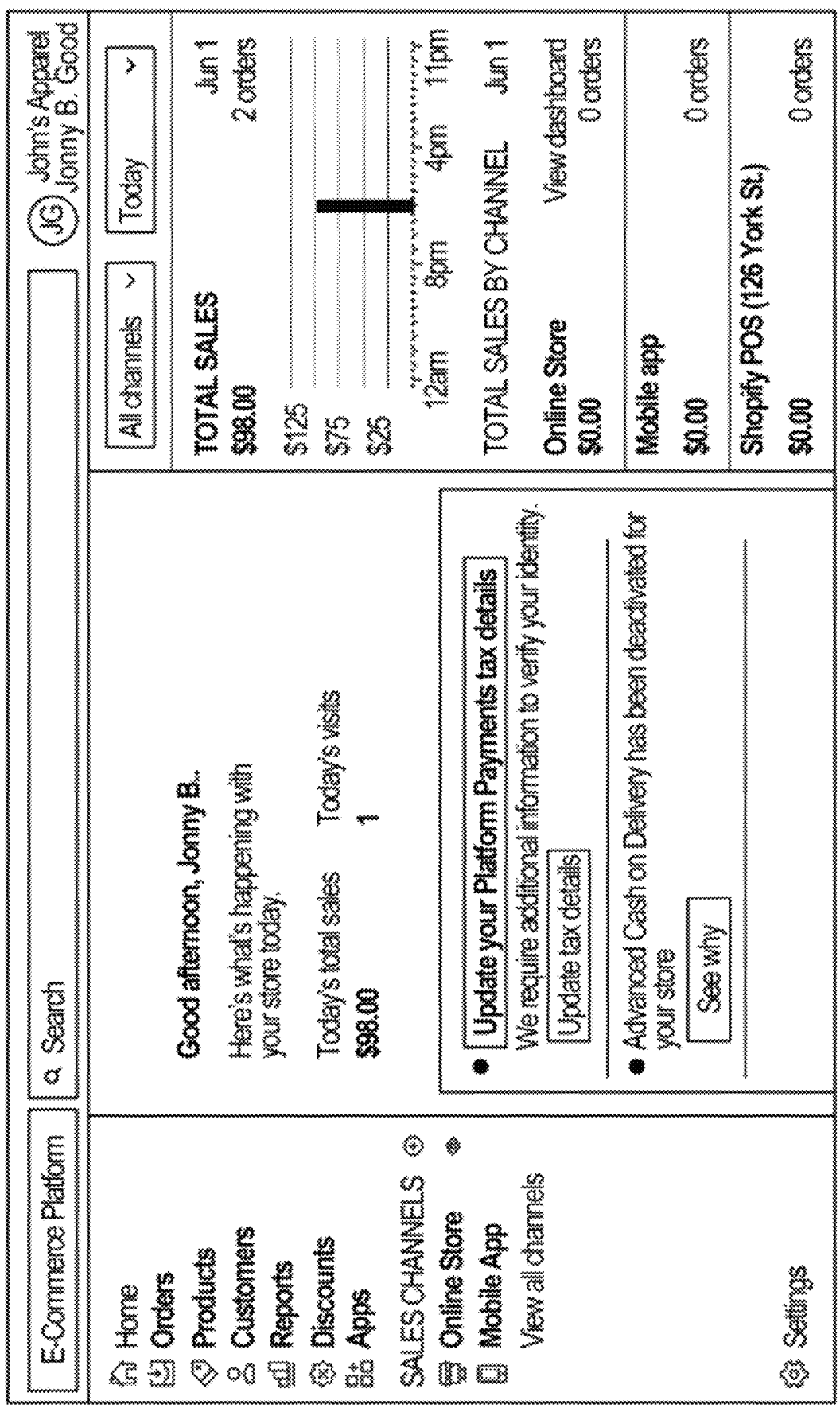
FIG. 2 illustrates an example home page of an administrator.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementation in an E-Commerce Platform

Figure 3:
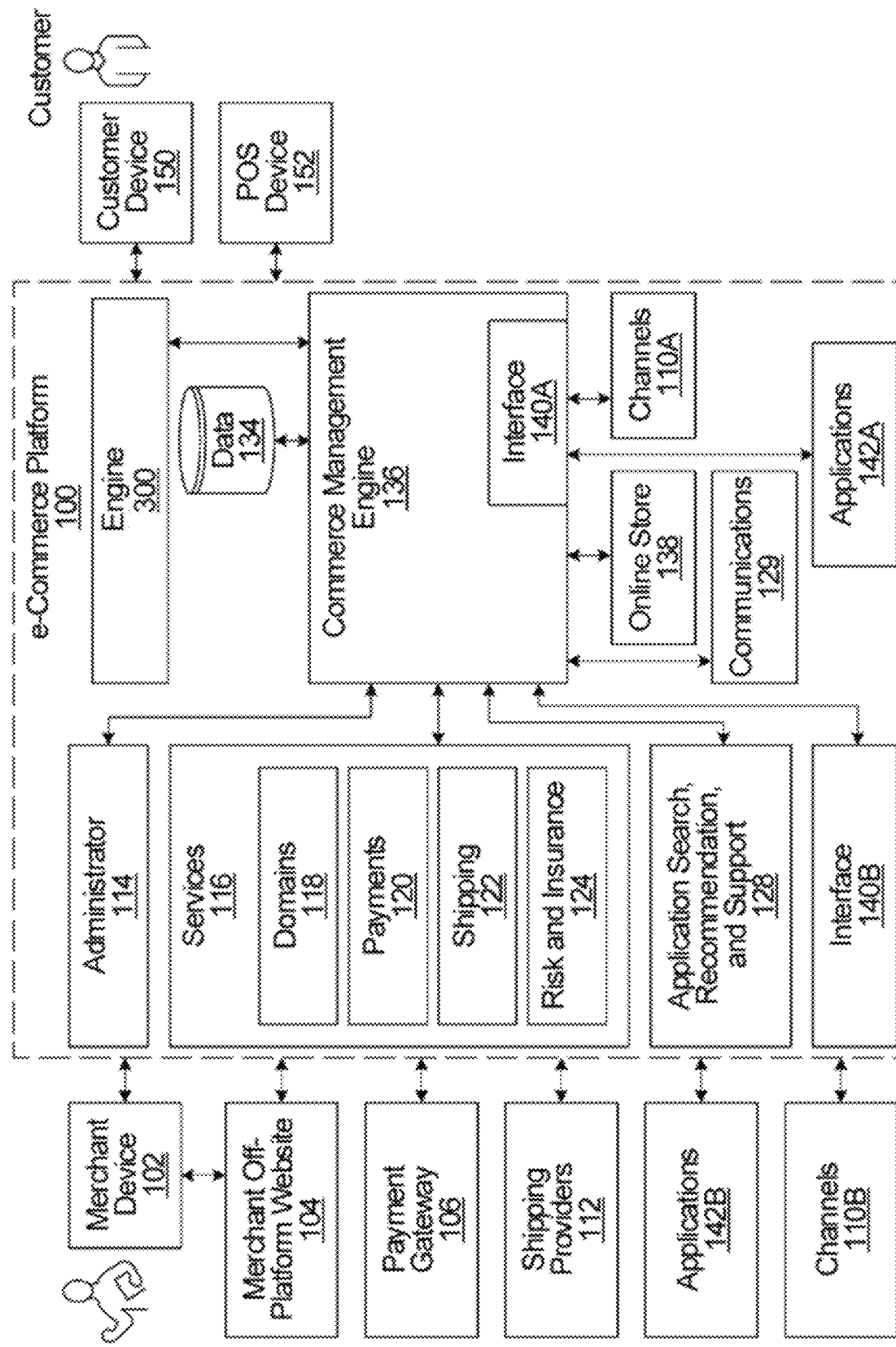
FIG. 3 illustrates another implementation of an e-commerce platform.

The functionality described herein may be used in commerce to provide improved customer or buyer experiences. The e-commerce platform 100 could implement the functionality for any of a variety of different applications, examples of which are described elsewhere herein. FIG. 3 illustrates the e-commerce platform 100 of FIG. 1 but including an engine 300. The engine 300 is an example of a computer-implemented system that implements the functionality described herein for use by the e-commerce platform 100, the customer device 150 and/or the merchant device 102.

Although the engine 300 is illustrated as a distinct component of the e-commerce platform 100 in FIG. 3, this is only an example. An engine could also or instead be provided by another component residing within or external to the e-commerce platform 100. In some embodiments, either or both of the applications 142A-B provide an engine that implements the functionality described herein to make it available to customers and/or to merchants. Furthermore, in some embodiments, the commerce management engine 136 provides that engine. However, the location of the engine 300 is implementation specific. In some implementations, the engine 300 is provided at least in part by an e-commerce platform, either as a core function of the e-commerce platform or as an application or service supported by or communicating with the e-commerce platform. Alternatively, the engine 300 may be implemented as a stand-alone service to clients such as a customer device 150 or a merchant device 102. In addition, at least a portion of such an engine could be implemented in the merchant device 102 and/or in the customer device 150. For example, the customer device 150 could store and run an engine locally as a software application.

The engine 300 could implement at least some of the functionality described herein. Although the embodiments described below may be implemented in association with an e-commerce platform, such as (but not limited to) the e-commerce platform 100, the embodiments described below are not limited to e-commerce platforms.

Authentication Across Network Domains

Figure 4:
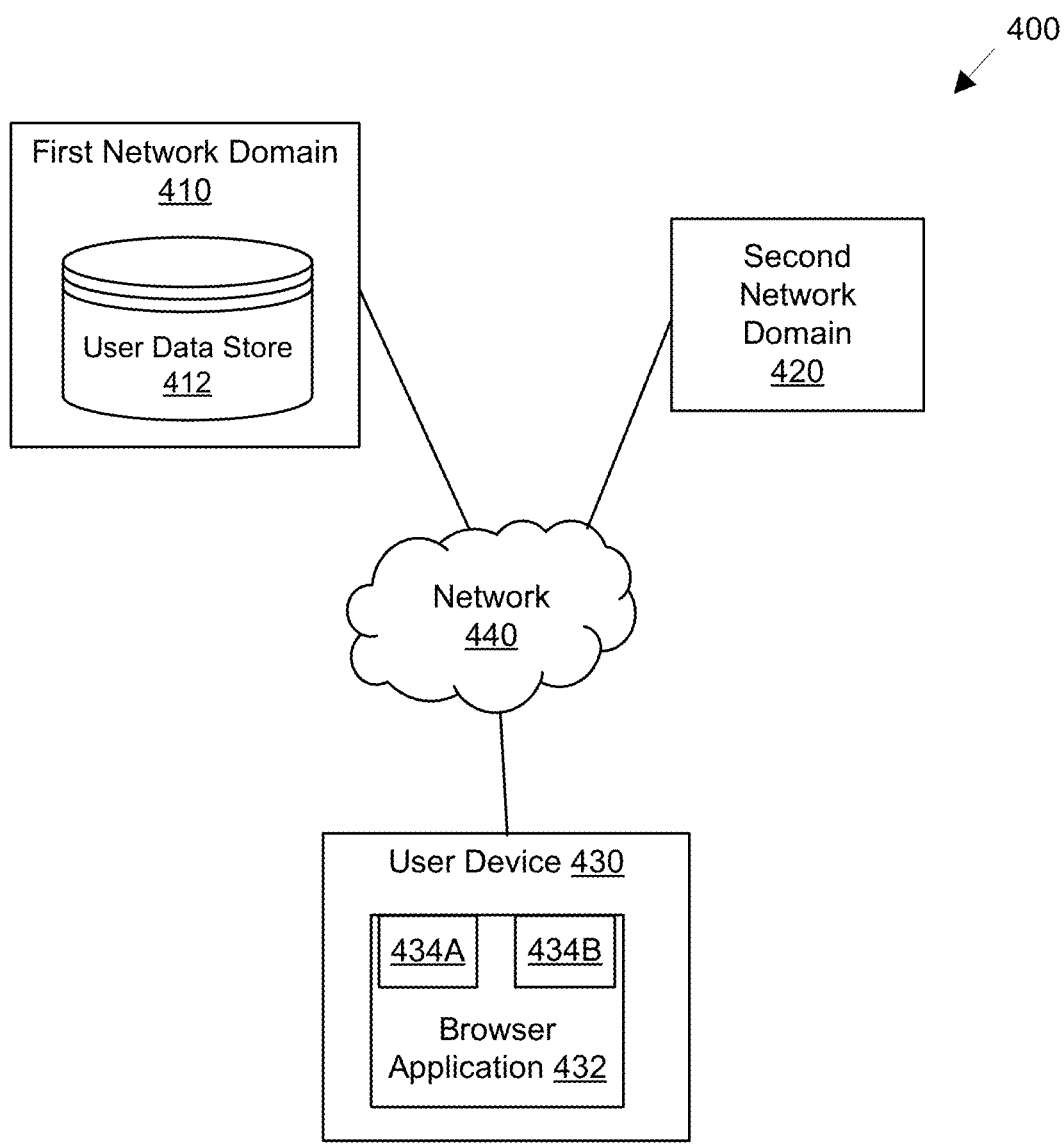
FIG. 4 is a block diagram illustrating an environment in which user authentication is performed, according to some implementations.

FIG. 4 is a block diagram illustrating an environment 400 in which user authentication is performed, according to some implementations. As shown in FIG. 4, the environment 400 includes a first network domain 410, a second network domain 420, and a user device 430, which communicate over a network 440 (such as the Internet). Other implementations of the environment 400 can include additional, fewer, or different entities.

The first network domain 410 represents a first set of services that are accessible by user devices or other network domains via the network 440. For example, one or more servers associated with the first network domain 410 provide a service for use in other network domains, such as the second network domain 420. An example type of service offered by the first network domain 410 is a payment processing service, in which a server associated with the first network domain completes a payment to a third-party on behalf of a user of the payment processing service. Users use the payment processing service to complete transactions associated with third parties to improve security (e.g., because the users trust the payment processing service to securely handle financial account information) or for convenience (e.g., because users do not need to re-enter financial account information for each transaction). The first network domain 410 can provide other types of services in addition to or instead of payment processing services.

Users of the services provided by the first network domain 410 can each have a user account with the first network domain 410. A computing device associated with the first network domain 410, such as a server, maintains user account data in one or more user data stores 412 that is accessible to the computing device. The user account data includes one or more identifiers that are usable to identify a user's account at the first network domain. For example, the identifiers can include a telephone number for a mobile or landline telephone accessible to a user or an email address for an email account used by the user.

In some implementations, the user data store 412 stores additional information associated with user accounts with the first network domain 410. For example, when the first network domain 410 provides payment processing services, the user data store 412 stores information such as one or more payment methods linked to the account (e.g., credit or debit card numbers, bank account numbers, or credentials for a third-party payment processing service), a billing address for the linked payment method(s), and/or a shipping address where the associated user receives shipments of physical goods.

The second network domain 420, similar to the first network domain 410, represents a second set of services that are accessible by user devices or other network domains via the network 440. For example, the second network domain 420 includes one or more webpages. Users can have accounts with the second network domain 420 that are different from the user accounts associated with the first network domain. In an example, the second network domain 420 is an online storefront that users can browse to purchase various goods or services. The user account with the online storefront includes data such as past purchases by the user, rewards points collected by the user based on the past purchases, or browsing history of the user.

The user device 430 is a device used to access the first and second network domains. The user device 430 can include, for example, a personal computer (PC), tablet computer, mobile telephone, game console, music player, wearable electronic device, network-connected ("smart") device (e.g., a television or home assistant device), AR/VR systems (e.g., head-mounted display), or any other device capable of transmitting or receiving data over a network. In some implementations, the user device 430 executes a browser application 432 that is configured to access and render for display webpages from the first network domain 410 and/or second network domain 420.

As the browser application 432 accesses webpages from various network domains, the browser application stores cookies 434 to maintain information such as login credentials for an account associated with a corresponding network domain or activity performed on the network domain. Such data can be stored as first-party cookies, which are readable only by the domain in which the cookie was created. For example, FIG. 1 depicts the browser application 432 storing a first-party cookie 434A based on prior interaction with the first network domain 410 and a first-party cookie 434B based on prior interaction with the second network domain 420. When the browser 432 is accessing content of the second network domain 420, for example, the second network domain can read the cookie 434B but not the cookie 434A.

Activity performed by the browser application 432 on the second network domain 420 can be stored in one or more first-party cookies that are readable by the second domain but not readable by third-party domains, including the first network domain 410. Such activity can include, for example, an identifier used by a user to login to an account on the second network domain 420, such as an email address or a telephone number. When the second network domain includes an online storefront, a first-party cookie can also be used to store identifiers of items a user has added to a shopping cart for purchase.

As described above, the first network domain 410 provides a service that is available for use by visitors to the second network domain 420. When a visitor to the second network domain 420 accesses the service of the first network domain, some portions of a process for accessing the service are performed on the second network domain. To illustrate an example service, FIGS. 5A-5D are example user interfaces displayed during a process for using a payment processing service from the first network domain to purchase an item sold via a website on the second network domain.

Figure 5A:
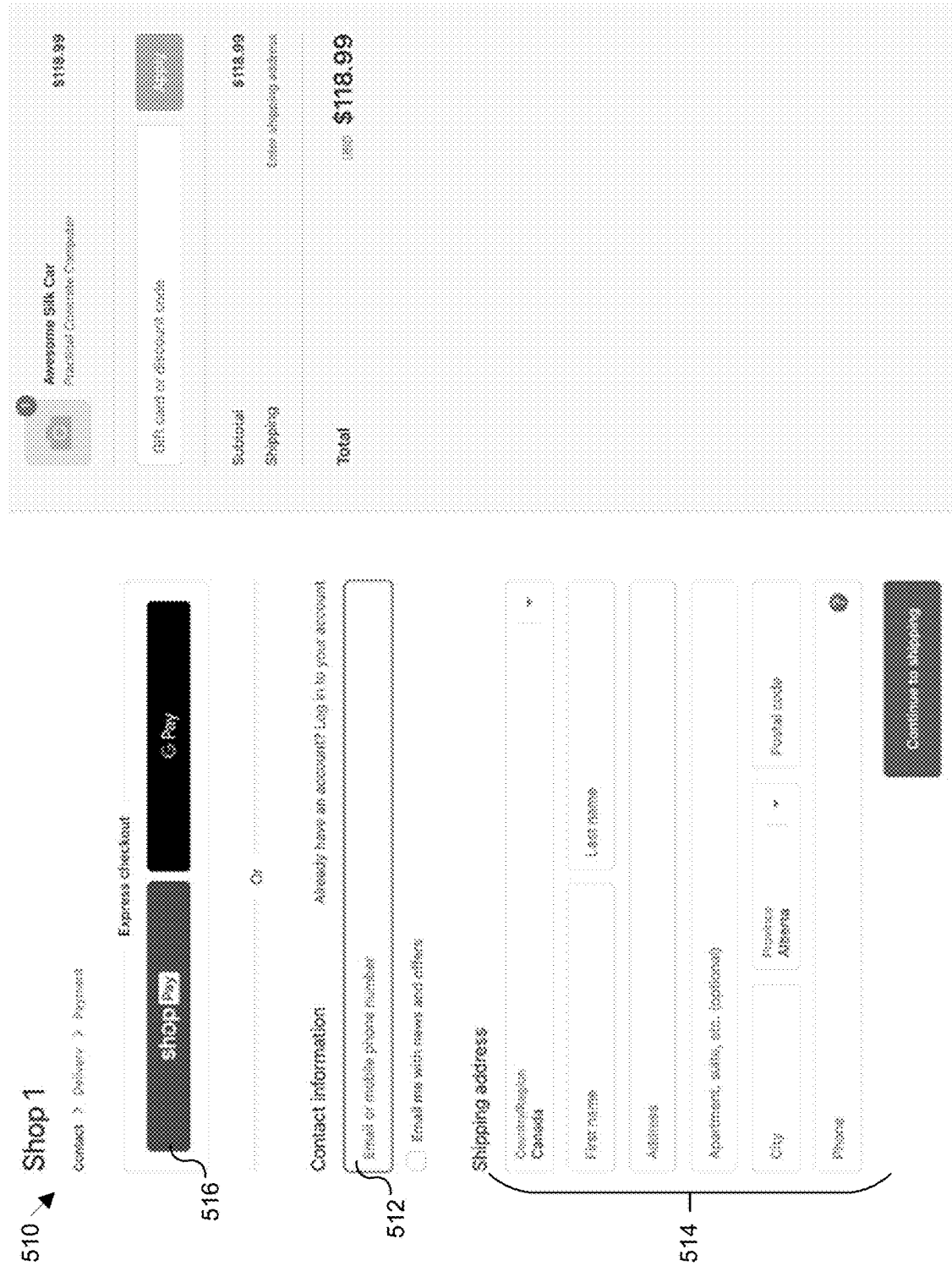

FIG. 5A illustrates an example interface 510 that is displayed when a checkout process is initiated in the second network domain 420 (e.g., when a user selects a "checkout" button on a webpage in the second network domain). The interface 510 is hosted by the second network domain 420 and presented, for example, via a webpage in the second network domain that is displayed by the browser application 432 on the user device 430. The interface 510 includes a form for the user to supply information to begin a purchase for an item, including an email or phone number entry element 512 and a shipping address entry element 514. The interface 510 also includes a button 516 selectable to perform an express checkout using the payment processing service provided by the first network domain 410.

Figure 5B:
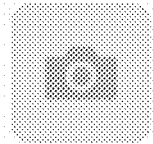

When the express checkout button 516 is selected on the interface 510, the browser application 432 is directed to a second user interface 520, depicted by way of example in FIG. 5B. The second user interface 520 provides a text entry box 522 configured to receive a user identifier to log into an account or create an account with the first network domain 410. In the example depicted in FIG. 5B, the text entry box 522 is configured to receive an email address, but can be configured in other implementations to receive another type of user identifier such as a telephone number or a username associated with an account on the first network domain. The second user interface 520 is hosted by the first network domain 410 and is presented, in some implementations, via a webpage. For example, the second user interface 520 is displayed in an inline frame (an "iframe") within the webpage that displayed the interface 510 shown in FIG. 5A.

After the user inputs an email address at text entry box 522, the user can select a button 524 to continue checking out with the payment processing service. In response to selection of the button 524, the browser application is directed to the example user interface 530 depicted in FIG. 5C. Like the user interface 520, the user interface 530 is hosted by the first network domain 410, for example in an iframe displayed by the browser application 432. Additionally, selection of the button 524 can cause a server associated with the first network domain to transmit a confirmation code to a user device. When the email address or other user identifier input in the text entry box 522 is registered to an existing user account, the confirmation code can be transmitted to the user device to start a two-factor authentication procedure to authenticate the user's use of the payment processing service.

Figure 5C:
Figure 5C:
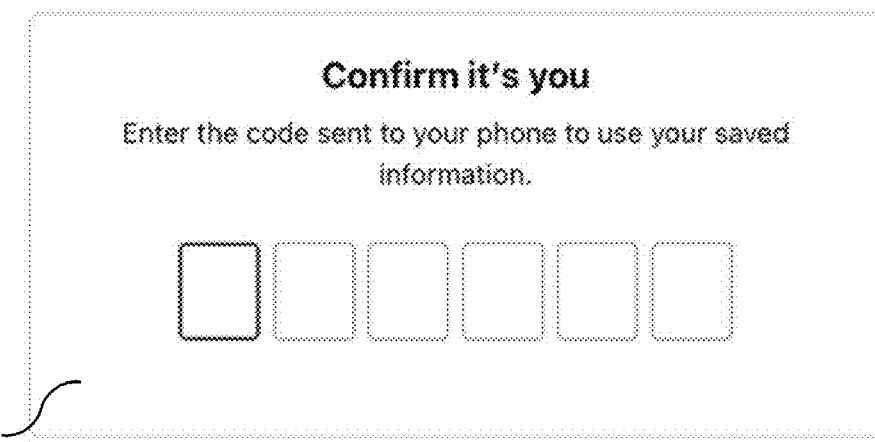
Figure 5C:
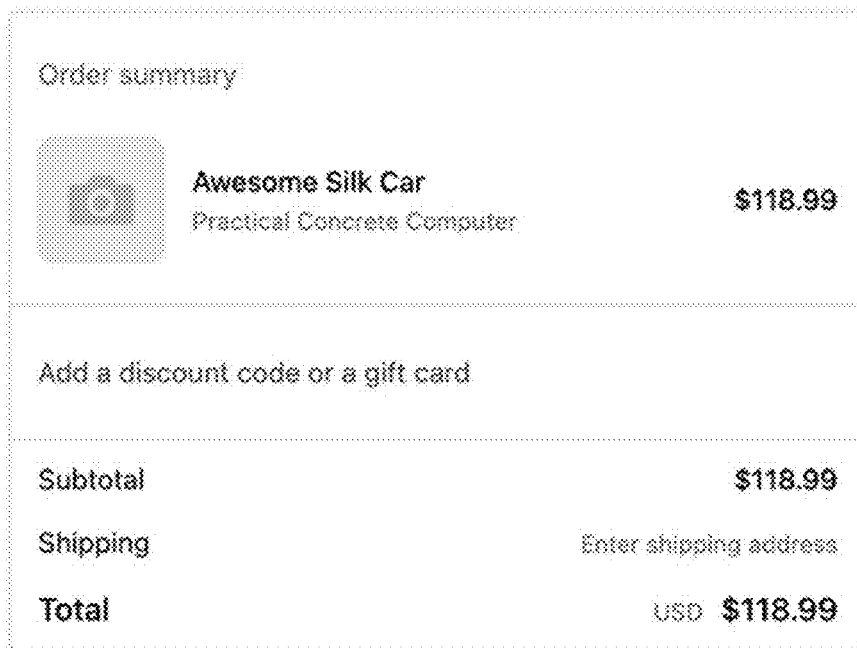

As shown in FIG. 5C, the user interface 530 includes a confirmation code entry region 532 that is configured to receive input purporting to be a confirmation code transmitted to the user device. If the input purporting to be the confirmation code does not match the transmitted confirmation code, the first network domain may provide one or more options at the user interface 530 instead of displaying the confirmation interface 540. For example, the user may reenter the confirmation code, request the confirmation code be re-sent, or log in to an account using a different email address or telephone number.

If the input received in the confirmation code entry region 532 matches the confirmation code transmitted to the user device, the first network domain directs the browser application 432 to a confirmation interface 540, an example of which is depicted in FIG. 5D. The confirmation interface 540 includes details such as a shipping address 542, a delivery method 544, a payment method 546, and confirmation of a total price 548. At least some of the information on the confirmation interface 540 can be retrieved from a user account associated with the previously entered email address or telephone number. For example, the shipping address and payment method (e.g., a credit card number and billing address, as depicted in FIG. 5D) can be retrieved from the user account without input from the user to re-enter the information.

Some users may have multiple shipping addresses or payment methods linked to the same account. In this case, an arrow 550 displayed in the interface 540 can be activated to display a drop-down list of other shipping addresses or payment methods linked to the account if a user desires to select an alternative address or payment method or to add new information. The particular shipping address or payment method that is displayed initially on the confirmation interface 540 can be selected automatically by the server. For example, the server displays the most frequently used shipping address or payment method, or the last-used shipping address or payment method. Alternatively, the server selects the initial shipping address or payment method based on the email address or telephone number used to access the user account. For example, a user may typically use a first email address (e.g., a personal email address) when shipping purchases to a first address (e.g., a home address), but a second email address (e.g., a work email address) when shipping purchases to a second address (e.g., a work address).

Finally, the user can select a "Pay Now" button 552 in the confirmation interface 540 to complete the purchase transaction. Once the purchase has been completed, the browser application 432 may redirect the user back to a webpage on the second network domain.

When a user has an account with both the online storefront and the payment processing service, it can be redundant to display all the interfaces depicted in FIGS. 5A-5D. For example, some of the interfaces may require the user to input information that had already been input at the storefront, thus introducing friction into the online checkout process. To mitigate such friction, the second network domain 420 passes an indication container object to a server associated with the first network domain 410. The indication container object, which can be generated based on data stored in a first-party cookie accessible to the second network domain 420 but not accessible to the first network domain 410, contains a unique identifier obtained based on activity in the second network domain 420. For example, the indication container object contains an email address or telephone number linked to a user's account with the second network domain 420. Based on the indication container object, the server associated with the first network domain 410 obtains information about the user that enables one or more of the interfaces depicted in FIGS. 5A-5D to be bypassed and/or to be pre-populated with user data.

Computer System

Figure 6:
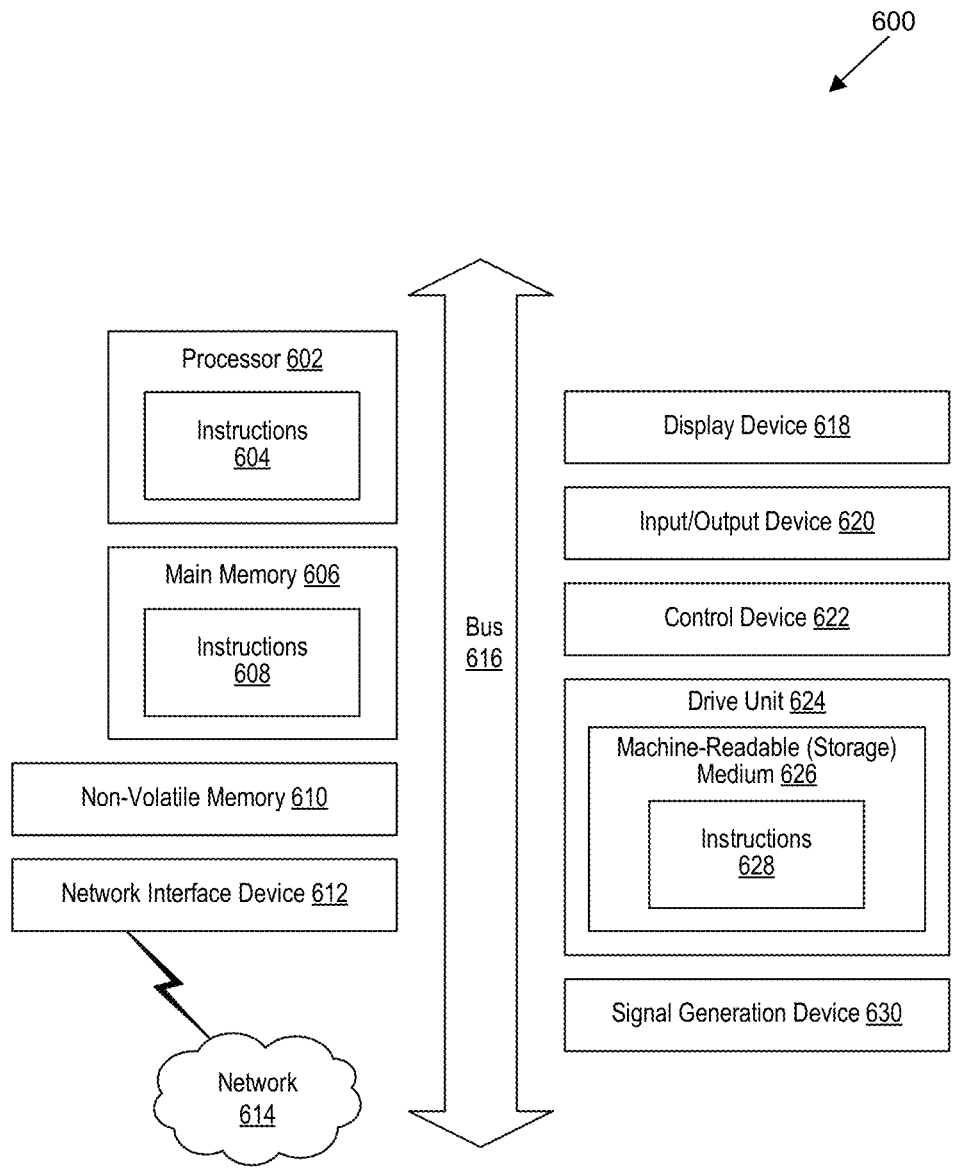
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementations, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Figure 7:
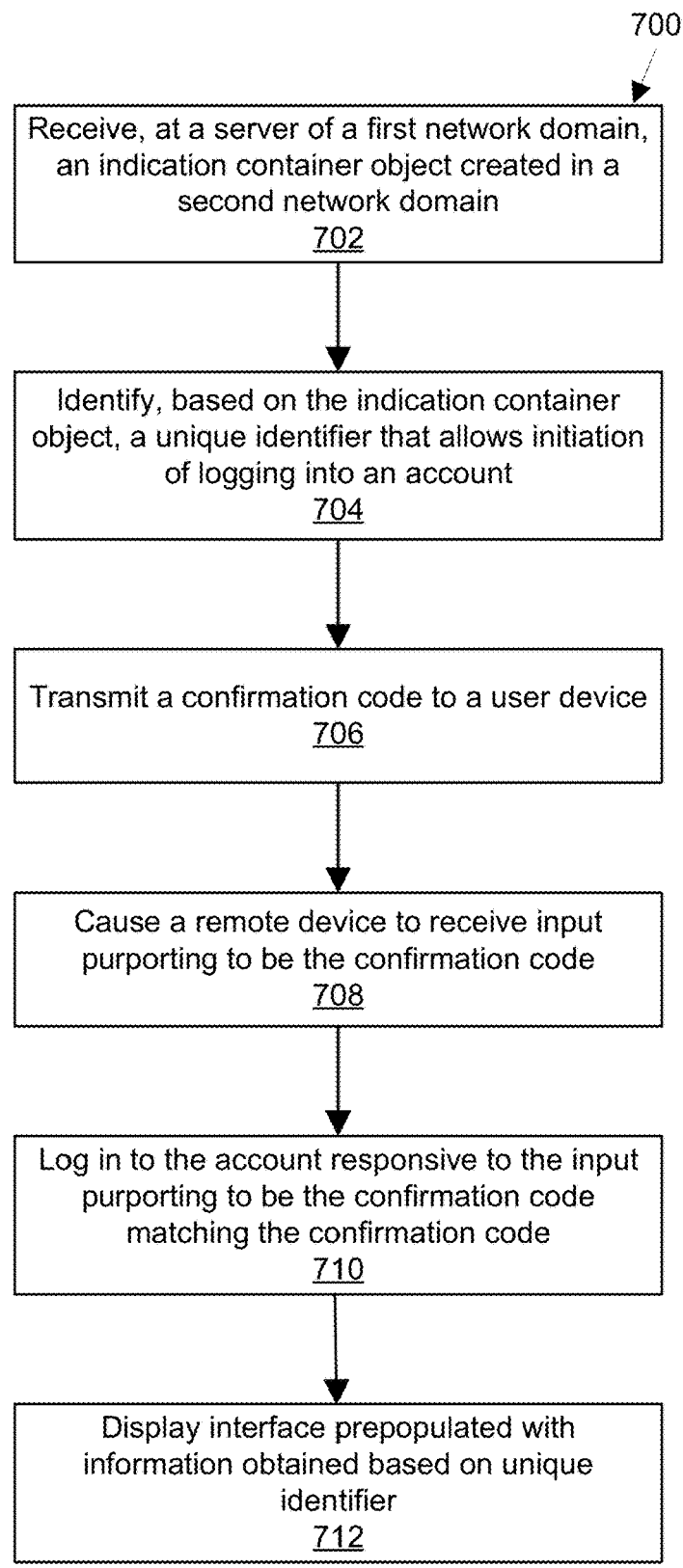
FIG. 7 is a flowchart illustrating a process for authenticating users across different network domains, according to some implementations.

FIG. 7 is a flowchart illustrating a process 700 for authenticating users across different network domains, according to some implementations. The process 700 can be performed by the computing system 600 including a server associated with the first network domain 410. Other implementations of the process 700 include additional, fewer, or different steps, or perform the steps in different orders.

At step 702, the server of the first network domain receives an indication container object created in a second network domain. The indication container object can be generated based on an action performed in the second network domain. For example, when the second network domain is an online storefront, an indication container object can be generated when a user browsing the storefront adds an item to a shopping cart.

At step 704, the server identifies, based on the indication container object, a unique identifier that allows initiation of login into an account. The unique identifier includes, for example, an email address or a telephone number that is linked to both a user account in the first network domain 410 and a user account in the second network domain 420. Since the unique identifier is identified based on the indication container object, the server does not need to access a third-party cookie in a browser application in order to determine the unique identifier. Thus, the server is able to identify the unique identifier even in circumstances where, for example, a third-party cookie does not exist or cannot be accessed by the server.

At step 706, the server causes transmission of a confirmation code to a user device that is identified based on the unique identifier. In some cases, the unique identifier is itself sufficient to transmit a confirmation code to a user device. For example, the unique identifier may be a telephone number for a mobile phone, and the server may cause the confirmation code to be transmitted in a short message service (SMS) message to the telephone number. In another example, the unique identifier is an email address, and the server causes a confirmation code to be transmitted to a user device by sending an email to the email address. In one example, the unique identifier could be composite of one or more items (e.g., telephone number, email address) and could include more than one of these items and these items could be tested as a combination or based on various possibilities of matching (match some, match all, match at least one, etc.). Using a combination or composite could address an issue where more than one account may share the same phone number. In another example, the unique identifier could be an object that has various fields; however, in some cases, some of those fields could be null (e.g., if unknown).

In other cases, the server uses the unique identifier to obtain a different identifier associated with a user device. For example, the server uses a unique identifier of an email address to access a user account and obtain a telephone number for the user, enabling the server to transmit an SMS message to the telephone number. As such, this feature is useful if a telephone number is not a unique identifier (e.g., if not enforced). Likewise, a unique identifier of a telephone number can be used to instead obtain an email address of the user. In another example, a unique identifier in the form of a telephone number for a landline telephone can be used to obtain a telephone number for a mobile telephone that is capable of receiving SMS messages. The server may cause the confirmation code to be sent to the user device via an external system. For example, the server may cause an SMS service to transmit an SMS message to the user's mobile phone.

The confirmation code transmitted to the user device allows completion of login to the account. At step 708, the server causes a remote computing device to receive an input that purports to be the confirmation code. For example, the server causes a user device to display a confirmation code entry interface (e.g., as illustrated in FIG. 5C) that is configured to receive the input purporting to be the confirmation code. Presenting the confirmation code entry interface can bypass a login interface, such as that shown by way of example in FIG. 5B, by which a user supplies an identifier to log into the account. Alternatively, the server causes the browser application to display the login interface, but prepopulates the login interface with the unique identifier of the user. In some implementations, the server also bypasses an initial payment interface, such as that depicted in FIG. 5A. For example, if a user has previously used the payment processing service to complete purchases, the server may cause the confirmation code entry interface to be displayed in response to a user selecting a checkout button in the second network domain.

If the input purporting to be the confirmation code matches the confirmation code transmitted to the user device, the server completes the login into the account at step 710. In one example, where the first domain operates a payment processing service, logging into the account enables payment for an item or service to be processed via the payment processing service. The payment processing service uses a payment method linked to the account to process the payment, for example by debiting a financial account associated with the linked payment method.

At step 712, the server displays an interface pre-populated with information obtained based on the unique identifier. In some implementations, the server obtains data such as a shipping address, billing address, or financial account number based on the unique identifier. For example, the server identifies a user account associated with the unique identifier and retrieves the data from the user account. The server can then display a payment details interface prepopulated with the shipping address, billing address, or at least a portion of the financial account number. For example, the server can display a payment details interface that is similar to the confirmation interface 540 depicted in FIG. 5D, which includes the shipping address 542 and payment details 546 obtained from a user account.

Figure 8:
FIG. 8 illustrates an example confirmation code entry interface.

In another example, the server displays a subtotal interface that includes an estimated shipping cost calculated based on an obtained shipping address. For example, in FIG. 8 illustrates an estimated shipping cost 802 being provided on the confirmation code entry interface 530. The estimated shipping cost 802 is calculated based on the shipping address of the user obtained from the user account.

In some implementations, the server further modifies data stored in a user account to include at least a portion of the data in the indication container object. For example, if the indication container object included an email address and a telephone number but the user account included only a telephone number, the server updates the user account to also include the email address.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation.

The applicant reserves the right to pursue such additional claim forms in either this application or in a continuing application.

We claim:

1. A computer-implemented method for secure and privacy-compliant user authentication across network domains, the method comprising:
   receiving, by a server of a first network domain, an indication container object created in a second network domain based on a first-party cookie stored by a browser application and created by and accessible to the second network domain and not accessible to the first network domain;
   identifying, by the server without accessing or requiring a third-party cookie and based on the indication container object, a unique identifier, wherein the unique identifier allows initiation of logging into an account;
   transmitting, by the server, a confirmation code to a user device, wherein the user device is identified based on the unique identifier;
   receiving, by the server from a remote computing device, an input purporting to be the confirmation code; and
   completing, by the server, login into the account responsive to the input purporting to be the confirmation code matching the confirmation code.

2. The computer-implemented method of claim 1, further comprising:
   causing, by the server, a remote computing device to bypass presenting a login interface and present a confirmation code entry interface,
   wherein the login interface enables entry of the unique identifier to present the confirmation code entry interface, and
   wherein the confirmation code entry interface is configured to receive input purporting to be the confirmation code.

3. The computer-implemented method of claim 1, further comprising:
   causing, by the server, a remote computing device to present a login interface prepopulated with the unique identifier.

4. The computer-implemented method of claim 1, wherein the indication container object is created based on interaction with one or more webpages in the second network domain.

5. The computer-implemented method of claim 1, wherein the indication container object comprises a telephone number of a mobile phone corresponding to the user device, and wherein transmitting the confirmation code to the user device comprises:
   causing transmission of a short message service (SMS) message to the telephone number of the mobile phone.

6. The computer-implemented method of claim 1, wherein the indication container object comprises an email address, and wherein transmitting the confirmation code to the user device comprises:
   transmitting, by the server, an email to the email address.

7. The computer-implemented method of claim 1, wherein the indication container object comprises a telephone number, and wherein identifying the unique identifier based on the indication container object comprises:
   retrieving, by the server, an email address from a user account associated with the telephone number, wherein transmitting the confirmation code to the user device comprises transmitting the confirmation code in an email to the email address.

8. The computer-implemented method of claim 1, wherein the indication container object comprises an email address, and wherein identifying the unique identifier based on the indication container object comprises:
   retrieving, by the server, a telephone number from a user account associated with the email address, wherein transmitting the confirmation code to the user device comprises transmitting a short message service (SMS) message to the telephone number.

9. The computer-implemented method of claim 1, further comprising:
   accessing, by the server, a user account maintained by the server based on the unique identifier; and
   modifying, by the server, data stored in the account to include at least a portion of data in the indication container object.

10. The computer-implemented method of claim 1, wherein the indication container object includes data generated based on an action performed in the second network domain.

11. A non-transitory computer readable storage medium storing executable instructions for secure and privacy-compliant user authentication across network domains, execution of which by a processor causing the processor to:
    receive, at a server of a first network domain, an indication container object created in a second network domain based on a first-party cookie stored by a browser application and created by and accessible to the second network domain and not accessible to the first network domain;
    identify, at the server without accessing or requiring a third-party cookie and based on the indication container object, a unique identifier, wherein the unique identifier allows initiation of logging into an account;
    transmit a confirmation code to a user device, wherein the user device is identified based on the unique identifier;
    receive, from a remote computing device, an input purporting to be the confirmation code; and
    complete login into the account responsive to the input purporting to be the confirmation code matching the confirmation code.

12. The non-transitory computer readable storage medium of claim 11, wherein execution of the instructions further causes the processor to:
    cause a remote computing device to bypass presenting a login interface and present a confirmation code entry interface,
    wherein the login interface enables entry of the unique identifier to present the confirmation code entry interface, and
    wherein the confirmation code entry interface is configured to receive input purporting to be the confirmation code.

13. The non-transitory computer readable storage medium of claim 11, wherein the indication container object includes data generated based on an action performed in the second network domain.

14. A system for secure and privacy-compliant user authentication across network domains, the system comprising:
    at least one hardware processor; and
    at least one non-transitory memory storing instructions, which, when executed by the at least one hardware processor, cause the system to:
    receive, at a server of a first network domain, an indication container object created in a second network domain based on a first-party cookie stored by a browser application and created by and accessible to the second network domain and not accessible to the first network domain;

identify, at the server without accessing or requiring a third-party cookie and based on the indication container object, a unique identifier, wherein the unique identifier allows initiation of logging into an account;

transmit a confirmation code to a user device, wherein the user device is identified based on the unique identifier;

receive, from a remote computing device, an input purporting to be the confirmation code; and complete login into the account responsive to the input purporting to be the confirmation code matching the confirmation code.

15. The system of claim 14, wherein the instructions when executed by the at least one hardware processor further cause the system to:

cause, by the server, a remote computing device to bypass presenting a login interface and present a confirmation code entry interface, wherein the login interface enables entry of the unique identifier to present the confirmation code entry interface, and wherein the confirmation code entry interface is configured to receive input purporting to be the confirmation code.

16. The system of claim 14, wherein the instructions when executed by the at least one hardware processor further cause the system to:

cause, by the server, a remote computing device to present a login interface prepopulated with the unique identifier.

17. The system of claim 14, wherein the indication container object is created based on interaction with one or more webpages in the second network domain.

* * * * *